United States Patent [19]

Duncan

[11] 4,051,608
[45] Oct. 4, 1977

[54] TEACHING MACHINE

[76] Inventor: Ernest R. Duncan, Harmony Hill Mount Harmony Road, Bernardsville, N.J. 07924

[21] Appl. No.: 715,113

[22] Filed: Aug. 17, 1976

Related U.S. Application Data

[62] Division of Ser. No. 482,339, June 24, 1974, Pat. No. 3,974,575.

[51] Int. Cl.$^2$ .............................................. G09B 7/00
[52] U.S. Cl. .................................... 35/48 A; 35/9 A; 235/61.12 R
[58] Field of Search .............. 35/9 A, 9 E, 9 F, 31 R, 35/31 C, 31 G, 48 R, 48 A, 48 B, 8 R, 6; 235/61.12 R, 61.12 N

[56] References Cited

U.S. PATENT DOCUMENTS

| 2,340,251 | 1/1944 | Nesbit .................................. 35/48 R |
| 2,564,089 | 8/1951 | Williams et al. .................... 35/9 E X |
| 2,789,370 | 4/1957 | Studebaker et al. ................. 35/9 R |
| 2,798,669 | 7/1957 | Hale .................................... 35/48 A X |
| 2,965,975 | 12/1960 | Briggs ............................... 35/48 R X |
| 3,151,403 | 10/1964 | Sinex ................................. 35/9 R X |
| 3,252,229 | 5/1966 | Van Ostram ....................... 35/9 A |
| 3,353,280 | 11/1967 | Emde .................................. 35/9 A |
| 3,360,873 | 1/1968 | Tillutson et al. .................... 35/9 A |
| 3,373,265 | 3/1968 | Smitzer ........................... 235/61.1 Z R |
| 3,374,559 | 3/1968 | Smith, Jr. ............................ 35/31 G |
| 3,541,699 | 11/1970 | Baker .................................. 35/9 A |
| 3,570,146 | 3/1971 | Golden ............................... 35/48 R |
| 3,584,398 | 6/1971 | Meyer et al. ........................ 35/6 |
| 3,609,880 | 10/1971 | Arbon ................................. 35/9 A |
| 3,647,926 | 3/1972 | Rohloff et al. .................... 35/48 R |
| 3,711,963 | 1/1973 | Hunnicutt et al. ................. 35/9 A |
| 3,718,984 | 3/1973 | Hewitt ............................... 35/9 A |
| 3,718,986 | 3/1973 | Hewitt ............................... 35/9 A |
| 3,729,836 | 5/1973 | Mayeda ............................. 35/6 |
| 3,787,988 | 1/1974 | Nakajima et al. ............. 35/48 R X |
| 3,912,909 | 10/1975 | Harrison .................. 235/61.12 N X |
| 3,925,909 | 12/1975 | Duncan ............................ 35/9 A |
| 3,974,575 | 8/1976 | Duncan ............................ 35/9 A |
| 3,977,092 | 8/1976 | Duncan ............................ 35/48 A |

Primary Examiner—William H. Grieb
Attorney, Agent, or Firm—Edward R. Weingram

[57] ABSTRACT

A hand-held teaching machine is used in conjunction with a card having recorded thereon columns of visually readable statements of a plurality of problems and corresponding columns of machine readable answers. The machine has viewing apertures for allowing a student to view individual problems presented on the record member in either an equation or algorithm format and an answer display positionally associated with the viewing apertures for displaying the answer entered on the machine keyboard. Means are included in the machine for allowing the digits of a multidigit answer to be entered either from right to left or left to right, and for causing the display to flash repeatedly if the entered answer is correct. Means are also provided for storing information identifying which of the attempted problems were answered incorrectly and retrieving the stored information in response to a predetermined interrogation signal. The machine also has means for allowing it to be used as a calculator.

9 Claims, 7 Drawing Figures

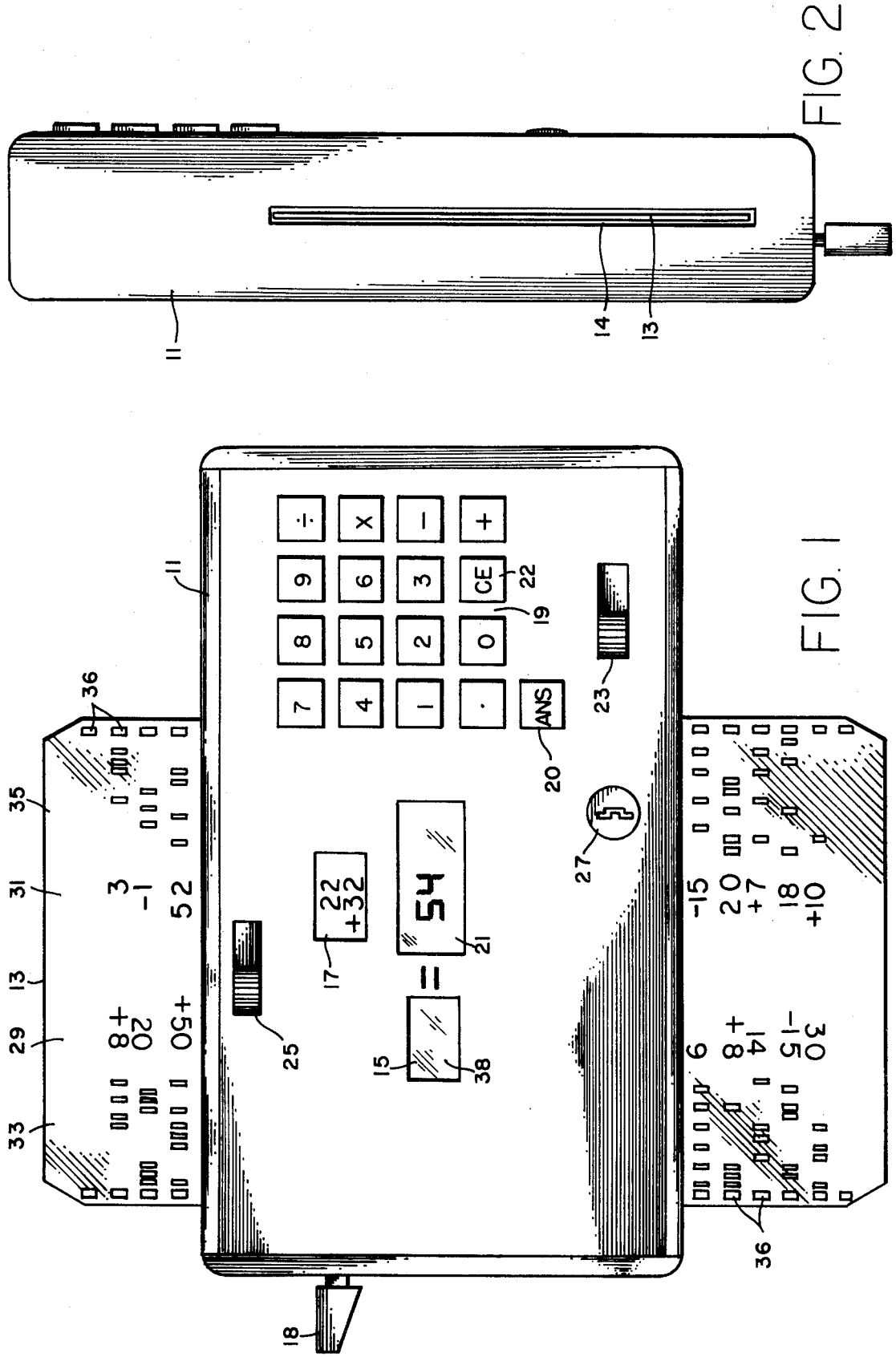

TEACHING MACHINE

This is a division of application Ser. No. 482,339, filed June 24, 1974, now U.S. Pat. No. 3,974,575, issued Aug. 17, 1976.

BACKGROUND OF THE INVENTION

1. Field of the Invention

This invention relates generally to an improved teaching machine and, more particularly, to an improved teaching machine having greater versatility and visual reinforcement of the learning experience than previous ones.

2. Description of the Prior Art

A number of teaching machines have been disclosed in which a student enters an answer to a displayed problem and the machine confirms the answer if it is correct. These machines have generally not achieved wide acceptance as standard teaching aids for the everday teaching of subjects to classes of students since all of them have severe disadvantages which prevent them from being practical.

A much improved teaching machine is described in applicant's previous patent application, Ser. No. 382,273, which was filed on July 24, 1973, now U.S. Pat. No. 3,925,909 issued Dec. 16, 1975. That application describes a teaching machine suitable for classroom use which uses a card record member that has recorded thereon visually readable statements of a plurality of problems and corresponding machine readable answers. In using the machine, the student first inserts the card and advances it in a step by step manner therethrough. The problems are positioned on the card in such a manner that a different one of them appears in a viewing aperture after each advance step. The student enters on the keyboard of the machine what he thinks to be the answer to the problem visible in the viewing aperture. The machine compares the answer entered by the student with the correct machine readable answer on the card and displays the answer entered by the student on the display only if the entered answer is correct. The machine includes counters for counting the number of correct answers and the total number of problems attempted, the contents of which counters are accessible only to the teacher having a key. Thus the machine may be used in either a teaching or testing mode.

While the above-described teaching machine offers significant improvements over those of the prior art devices, some aspects of the teaching machine would benefit from further development. One area for development would be to make the machine more versatile so that it can be used in a greater number of classroom and other situations. For example, it would be advantageous to expand the format of problems that can be presented by the machine. Previously known teaching machines generally allow mathematical problems to be presented in only one of either an algorithm or equation format so that the student using such a machine does not gain experience in handling problems presented in the other format.

Another area for development would be to provide means which allow the use of the machine by the student as a calculator so that the student can use the machine to check work he has performed independently of any prescribed training or testing program.

It would also be desirable to provide means to vary the manner in which answers may be entered into the machine. When computing the answer to a mathematical problem having a multidigit answer, the student generally generates the digits of the answer from right to left. In applicant's above-described previous teaching machine and in other prior art machines, however, the digits of the answer must be entered from left to right. This often requires the student to make the calculations on a separate sheet of paper and results in increased transcription errors not related to his mathematical knowledge. Additionally, the ability to use the machine without having to write the answers on a separate sheet of paper would increase the usefulness of the teaching machine for students with learning disabilities which make writing or routine transferrence of imformation difficult.

It would also be desirable to develop certain teaching aspects of the above-described teaching machine relating to reinforcement of the student's learning experience and the teacher's knowledge of particular difficulties encountered by the students. For example, it sould be desirable if the machine could display incorrect answers entered by the student as well as correct answers, and indicate to the student which answer is correct.

Additionally, while the above-described teaching machine does record information to tell the teacher the number of right and wrong answers entered by the student, it provides no way of indicating which problems or types of problems present particular difficulties to an individual student. It would be very helpful if the teacher could learn from the machine which specific problems the student has answered incorrectly, and also obtain some indication of how many incorrect attempts were made to answer the problem.

SUMMARY OF THE INVENTION

To further develop the art of teaching machines, applicant provides an improved teaching machine which is used in conjunction with a record member bearing visually readable statements of a plurality of problems and a corresponding plurality of machine readable answers. The machine includes alternative viewing apertures for allowing the student to view individual problems on the record member in either an equation or algorithm form and an answer display positionally associated with the apertures for displaying the answers entered on the machine keyboard by the student. The digits of the answer may be entered from left to right or right to left. Means are provided in the machine for causing the display to flash if the entered answer is correct and to cause it to operate in a steady state mode if the entered answer is incorrect. Means are further provided for storing in the machine information as to the number of problems correctly and incorrectly answered by the student, but also information identifying which of the attempted problems were answered incorrectly and the number of incorrect attempts made in answering a particular problem. Interrogation means are provided to allow the teacher to obtain the stored information on demand. In order to further increase its versatility means are provided for allowing the teaching machine also to be used as a calculator.

A record member is also provided which coacts with apparatus in the machine to select the proper alternative viewing aperture of the machine. The record member is efficiently designed to enable problems in different formats to be placed on the same card.

It is, therefore, an object of the present invention to improve and increase the versatility of teaching machines.

It is another object of the present invention to provide a teaching machine which is useful both for teaching and for testing.

Yet another object of the present invention is to provide a teaching machine which can display the total problem to be solved and the total problem sentence when correctly answered.

Another object of the present invention is to provide an improved teaching machine which gives visual reinforcement to the student's learning experience.

It is yet another object of the present invention to provide an improved teaching machine which displays when a correct answer is given by the student.

Still another object of the present invention is to provide an improved teaching machine which displays all answers given by a student and indicates when a correct answer is given.

It is a further object of the present invention to provide an improved teaching machine which displays the answers given by a student in such a manner as to distinguish between correct and incorrect answers.

An additional object of the present invention is to provide an improved teaching machine which stores information for determining the number of correct and incorrect answers made by the student, in which this information is accessible only to the teacher and erasable only by the teacher.

It is another object of the present invention to provide means in a teaching machine to allow the teacher to discern whether an individual student is having difficulty with a particular type of problem.

Yet another object of the present invention is to provide a teaching machine in which the problem to be solved by the student may be presented in either an algorithm or equation format.

It is a further object of the present invention to provide a teaching machine having alternatively selectable apertures for viewing problems presented in different formats.

Additionally, it is another object of the present invention to provide a teaching machine in which different apertures for viewing problems presented in different formats can be automatically or manually selected.

A further object of the present invention is to provide a teaching machine which can be used without having the student first write the answer on paper and then enter it into the machine.

It is an added object of the present invention to provide a teaching machine which eliminates transcription errors when entering answers.

Another object of the present invention is to provide a teaching machine which is easily operated by students with writing difficulties or other learning disabilities.

It is yet another object of the present invention to provide an improved teaching machine in which the student may enter the digits of a multidigit answer from either left to right or right to left.

Still another object of the present invention is to provide a teaching machine which can be used by the student as a calculator.

Yet another object of the present invention is to provide a teaching machine in which the problems to be solved are contained on a reusable record member.

It is a further object of the present invention to provide a teaching machine which uses a record member which cannot be easily decoded or tampered with by the student to obtain correct answers.

Another object of the present invention is to provide a relatively inexpensive teaching machine, which is capable of performing meaningful teaching functions.

Still another object of the present invention is to provide a teaching machine which is relatively durable and tamperproof.

It is an added object of the present invention to provide a card record member having a plurality of visually readable statements of problems thereon in which the machine is responsive to an indication on readable card to determine whether the problem is presented in an equation or algorithm format.

A further object of the present invention is to provide a card record member which is efficiently designed to provide problems and answers in limited space.

It is yet another object of the present invention to provide a card record member which can be used repeatedly and on which the answers cannot be detected without the student's using the machine in which the card is utilized.

Another object of the present invention is to provide a card record member which can present problems in either an algorithm or equation format.

It is still another object of the present invention to provide a card record member which coacts with apparatus in the machine to alternately select viewing apertures for use in conjunction with problems printed on the card.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 1 is a front view of a preferred embodiment of the teaching machine in accordance with the invention.

FIG. 2 is a side view of the teaching machine of FIG. 1.

DESCRIPTION OF THE PREFERRED EMBODIMENT

Figure 3:
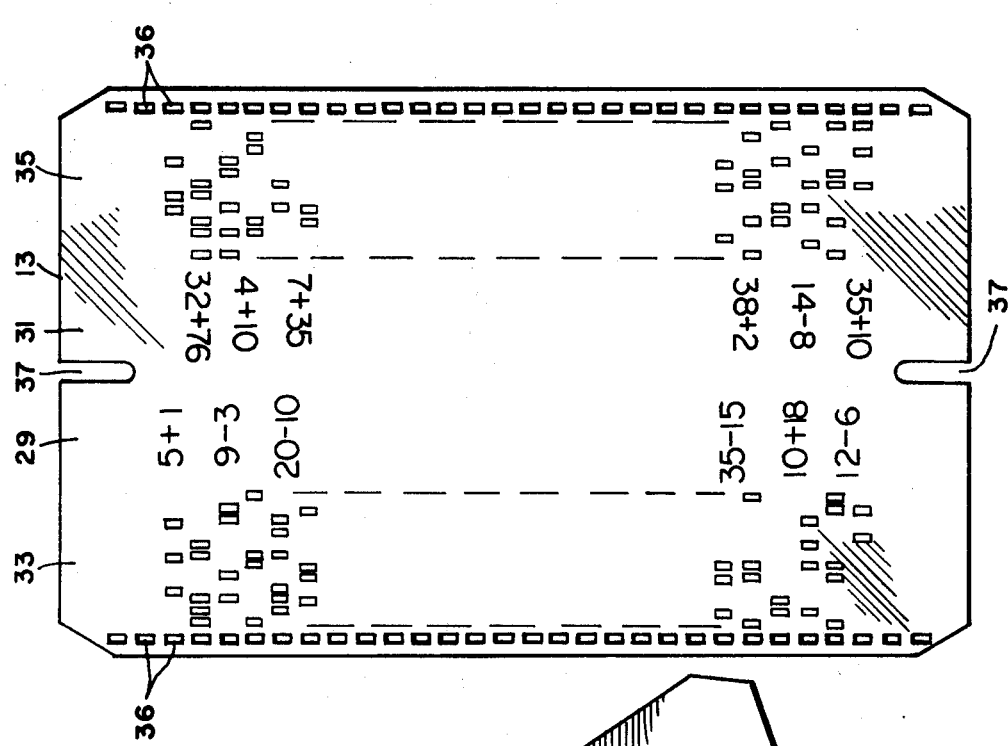
FIG. 3 shows a card record member for use with the teaching machine in accordance with the invention.

The invention can best be understood by referring to the following detailed description of the illustrated embodiment.

Referring now to FIGS. 1 and 2 of the drawing, the teaching machine according to the illustrated embodiment of the invention includes a casing 11 which may, for instance, be formed of plastic or metal. A reusable record member which may consist of a card 13 is inserted into a record member receiving slot 14 in the casing 11 so that a visually readable problem statement of the card appears in one of the viewing apertures 15 or 17. The card 13 is advanced through the machine in a step by step fashion by depressing advance lever 18, each advance of the card bringing a new problem into view in the viewing aperture 15 or 17. A keyboard 19 is provided for use by the student to enter an answer to the problem displayed in the apertures 15 or 17 when the machine is being used as teaching machine and for use by the student as a calculator keyboard when the teaching machine is being used in the calculator mode. The display 21, which may for instance be a liquid crystal or light emitting diode (LED) type, displays the answer entered by the student on the keyboard when the machine is being used in the teaching machine mode and displays the answer to the problem entered in the keyboard when the machine is being used in the calculator mode.

In the teaching machine mode, after the student enters what he feels to be the correct answer on the numerical keys of the keyboard 19 he depresses the answer key 20. If the answer he enters is correct the number displayed on the display 21 flashes or blinks, thereby indicating to the student the correctness of his choice and reinforcing his learning experience. If the answer which he enters is incorrect, the numbers displayed on the display 21 remain in a steady state condition. If while entering an answer on the keyboard 19, the student decides that he has made a mistake, he depresses the clear entry key (CE) 22 which allows him to start over in entering another answer.

Switch 23 is used to set the machine to accept the digits of a multidigit answer entered on the keyboard from either left to right or right to left when the machine is being used in the teaching machine mode. When used as a calculator, the digits of the operands are always entered from left to right.

Switch 25 may be optionally included in the machine according to the invention for controlling the masking of one or the other of the viewing apertures 15 or 17 so that only the aperture suitable for the particular problem statement format on the card 13 is open. Alternatively, as will be described below, means may be provided which are automatically responsive to indicia on the card 13 to mask one of the apertures upon the insertion of the card. The key operated switch mechanism 27 in the peferred embodiment of the invention has two positions, in one of which the machine operates in the teaching mode, and in the other of which it operates in a calculator mode. With the key inserted in the teaching machine mode position the teacher may interrogate the machine to determine the number of problems answered correctly and which problems the student has answered incorrectly.

Referring to FIGS. 1 and 3 of the drawings, the card record member 13 has four columns of information on each face. Columns 29 and 31 in the central portion of the card 13, contain lists of optically readable statements of problems which are positioned on the card 13 so that they are in alignment with the apertures 15 or 17 respectively, when the card 13, is inserted in slot 14 of the teaching machine. If the problems on the card 13 are to be presented to the student in the algorithm format they are then recorded on the card in the column 31 which is in alignment with the viewing aperture 17, as illustrated in FIG. 1. If the problems are to be presented to the student in equation form they are recorded in column 29, as are the problems on the card 13 illustrated in FIG. 3, so that they are in alignment with the viewing aperture 15 when the card 13 is inserted into the machine.

The column 33 contains machine readable statements of the answers to the problems in column 29 or 31 depending on the format of the problem statement. If the problems are presented in equation form, the machine readable answers in column 33 correspond to the visual readable problem statements in column 29 whereas if the problems are presented in algorithm form, the answers in column 33 correspond to the problem statement in column 31. In the illustrated embodiment of the invention, the machine readable statement of the answer is made up of a row of holes punched in the card 13 which are recorded in a binary-coded-decimal form requiring four hole places for the four bits of each digit. To allow for a three digit answer capability, a total of twelve hole places are required for each row. In order to prevent the student from reading the answer optically, extra hole tracks may be provided and the tracks may be scrambled so that tracks related to bits of different answer digits may be interlaced in a random fashion. Additional tracks may also be provided for problems in which a timed response is required.

It can be observed that there are two machine readable rows of information in answer column 33 for each problem in column 29 or 31. In the illustrated embodiment of the invention only one of these rows contains the answer to the corresponding problem. The other of these rows contains the answer to a corresponding problem on the reverse side of the card 13.

In order to maximize the number of problems contained on a single card without requiring further complication of the machine structure, a second column 35 of machine readable answers is provided proximate the other edge of the card from the column 33. This column 35 corresponds to the visually readable problem statements in the other of the columns 29 or 31 which are recorded upside down with respect to the problem statements in the previously discussed column 29 or 31. To operate on these problems the student reverses the card 13 and inserts it in the other direction into the receiving slot 14.

A column of indexing holes 36 are provided along either edge of the card 13 for use in the step by step advancing of the card 13 throughthe machine. As can be seen in FIG. 3 cards having information recorded thereon in an equation format may be provided with a notch 37 which cooperates with a mask 38 of the machine to cause the mask 38 to cover the viewing aperture 17 when the card 13 is inserted. The manner in which this is accomplished is discussed in more detail with relation of FIGS. 5 and 6.

Figure 4:
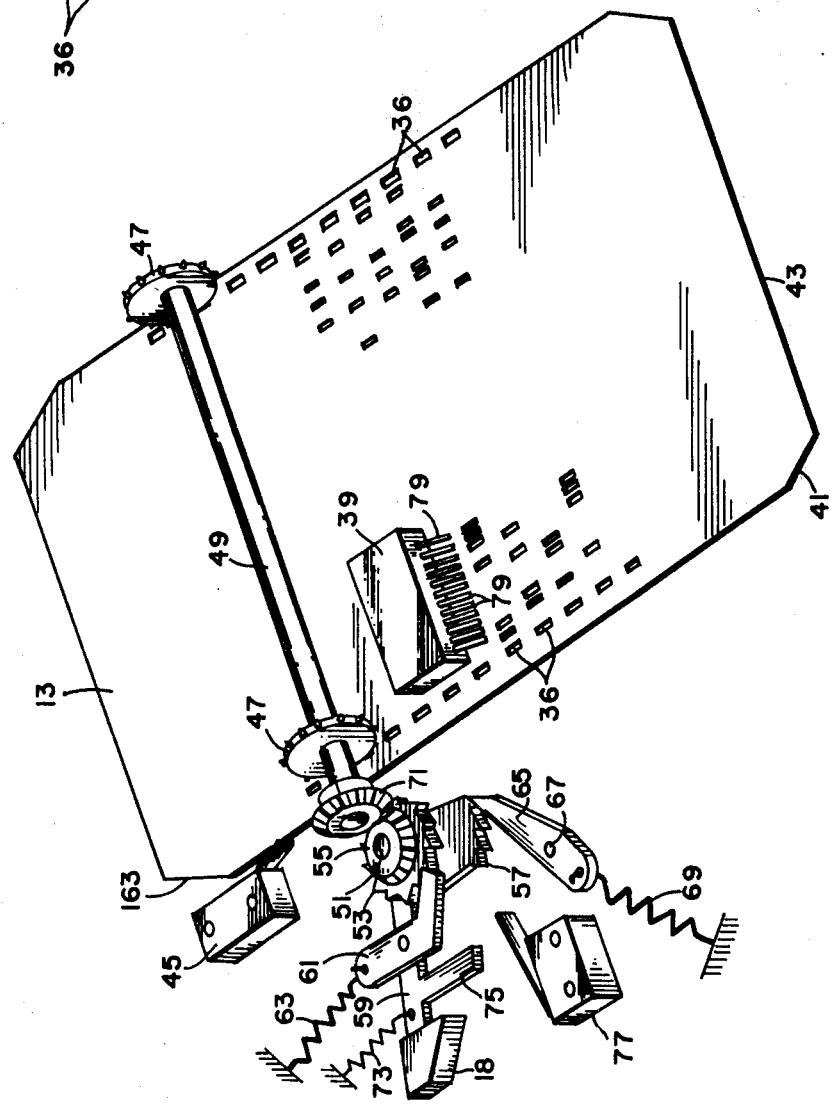
FIG. 4 is a simplified mechanical schematic of the card advance mechanism of the teaching machine of FIG. 1.

In FIG. 4 of the drawing there is illustrated a simplified mechanical schematic of a card advance mechanism and the answer reading brush assembly 39. When the card 13 is inserted into the card receiving slot 14 of the teaching machine, the lefthand chamfered portion 41 of the leading edge 43 of the card 13 depresses the actuating contact of the microswitch 45. The card 13 is stopped when the leading edge 43 strikes the card advance wheels 47 which are carried on shaft 49 and aligned with the columns of indexing holes 36 along either edge of the card 13.

The card advance lever 18 is pivotally mounted on a shaft 51. Also pivotally mounted on the shaft 51 is an indexing ratchet 53. A bevel gear 55 is affixed to and rotates with the ratchet 53. An antiback up ratchet 57 is attached to and rotates with the arm 59 of lever 18. An indexing pawl 61 is pivotally mounted on the arm 59 of lever 18 and biased into contact with the indexing ratchet 53 by the spring 63. A pawl 65 is pivotally mounted on the shaft 67 and biased into engagement with the anti-back up ratchet 57 by spring 69. The bevel gear 55 engages the bevel gear 71 which is affixed to and rotates with shaft 49. Lever 18 is biased toward its uppermost position by the spring 73.

In order to advance the card 13 so that the first problem is in registry with the proper viewing aperture 15 or 17 (FIG. 1), the student depresses the card indexing lever 18 thereby rotating arm 59 about the shaft 51 to tension spring 73. As spring 73 draws arm 59 upward, pawl 61 rotates the ratchet 53 in the clockwise direction which rotation is coupled through the bevel gears 51 and 71 to the shaft 49 in order to index the card 13 by the distance between adjacent problems in the column 29 or 31, thereby bringing the first or next problem into registry with the viewing aperture 15 or 17. If the student depresses the lever 18 only a portion of its stroke, the engagement of the pawl 65 with the anti-back up ratchet 57 prevents the lever 18 from returning upwardly until the lever 18 is pressed the rest of the way. When the lever 18 is depressed completely, the ratchet 57 moves beyond the pawl 65 so that, on the return stroke of the lever 18 and the ratchet 57, the ratchet 57 cams the back side of the pawl 65 out of the way.

The provision of the anti-back up ratchet 57 and pawl 65 prevents the card 13 from being partially indexed by the student causing misalignment of the problems in the columns 28 or 31 with the viewing aperture 15 or 17 respectively.

The extension 75 of the shaft 55 actuates the card advance microswitch 77 at the lower extreme of the path of travel of the lever 18 for purposes to be discussed below.

The machine readable answer in column 33 corresponding to the visually readable problem statement in column 29 or 31 is read by means of the reading head 39. In the illustrated embodiment of the invention reading head 39 may comprise the line of 12 brushes 79 which are aligned with the twelve tracks of hole locations in column 33 of binary-coded-decimal punched holes. When a brush 79 is in registry with the hole and column 33, it makes contact with ground plate positioned opposite the brushes 39, on the other side of the card 13. When a brush 79 is in contact with a portion of the card 13 in which no hole is punched, the brush 79 is insulated by the card 13 from the ground plate. Thus the reading head 39 can read a hole as a binary one and the absence of a hole as a binary zero or vice-versa.

It should be apparent that other types of brush configurations and other types of reading mechanisms, for instance star wheels, may equally well be used to read the coded rows of punched holes in column 33 of the card 13.

Figure 6:
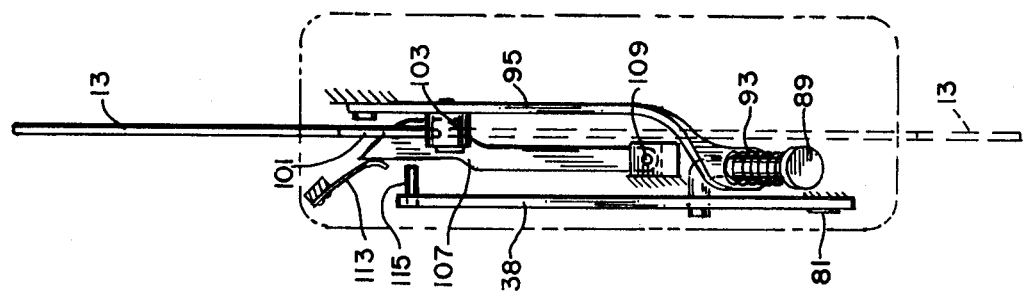
FIG. 6 is a side view of the mask position control mechanism of FIG. 5.
Figure 5:
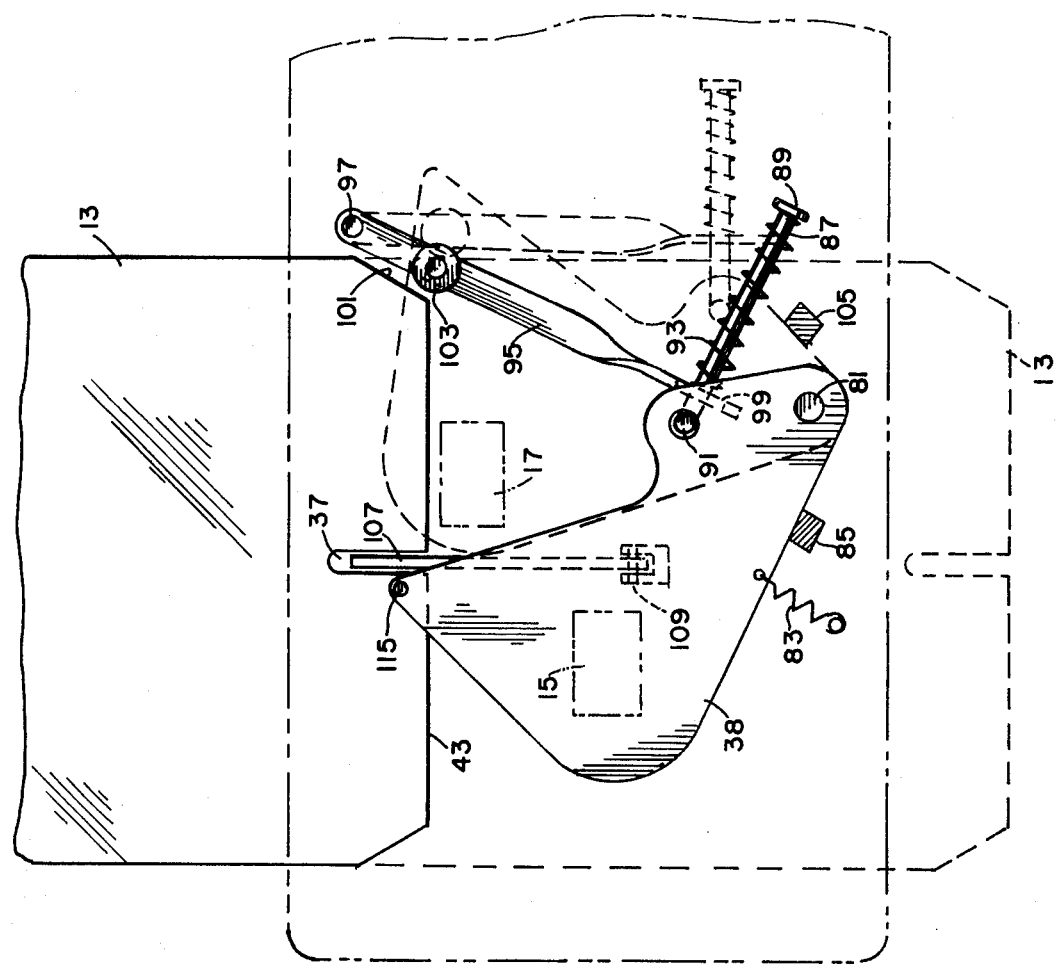
FIG. 5 shows a top view of the mask position control mechanism of the teaching machine of FIG. 1.

The mechanism for controlling the movement of the mask 38 (FIG. 1) to cover either viewing aperture 15 or 17 depending on the format of the problems recorded on the card 13 is illustrated in FIGS. 5 and 6 of the drawing. Mask 38 is pivotally mounted on shaft 81 and normally biased by a tension spring 83 against step 85 into a position where it covers the aperture 15. The position of the aperture 15 is shown by a dashed rectangle in FIG. 5. The shaft 87 having a flattened end 89, is pivotally mounted on the mask 38 by pin 91. A compression spring 93 rides axially on shaft 87 and is restrained at one end by the flattened portion 89. Actuating member 95 which is pivotally mounted proximate one end thereof on shaft 97 includes a slot 99 at the other end thereof which is coupled to shaft 87 and restrains the other end of the compression spring 93.

When the card 13 is inserted into the receiving slot 14 (FIG. 2) of the teaching machine in accordance with the invention the chamfered edge 101 strikes the actuating roller 103 of the actuating member 95 and pushes the actuating member 95 to the right as viewed in FIG. 5 thereby tending to compress spring 93. Since spring 93 is stronger than spring 93, the motion of actuating member 95 to the right is coupled through spring 93 and shaft 87 to the mask 38 which rotates to the right around shaft 81 to the position shown in dashed lines in FIG. 5 against stop 105. In this position mask 38 uncovers the aperture 15 and covers aperture 17, whose position is shown as a dashed rectangle in FIG. 5.

Interference member 107 is pivotally mounted on pin 109 and is normally downwardly biased out of the path of mask 38 against stop 111 by leaf spring 113. The interference member 107 is mounted in alignment with the slot 37 in cards 13 having problems recorded thereon in the equation format such as seen in FIG. 3 and shown in FIG. 5.

If the card 13 inserted into the receiving slot 14 has problems recorded thereon in the algorithm format, such as a card seen in FIG. 1 of the drawing, the card 13 does not contain the slots 37 so that the leading edge 43 of the card 13 cams the interference member 107 upwardly into the path of the lug 115 on the mask 38 before the chamfered edge 101 of the card 13 pushes the actuating member 95 to the right. Thereafter, when the chamfered edge 101 of the card 13 does push the actuating member 95 to the right the mask 38 is restrained from rotating clockwise around the pivot 81 by the interference member 107. Thus the mask 38 containues to cover the aperture 15 and to leave open the aperture 17 thereby allowing the student to see the algorithm format problems recorded in column 31 of the card 13.

If the card has the slot 37, such as is shown in FIG. 5 of the drawing, when the chamfered edge 101 of the inserted card 13 strikes the actuating roller 103 it moves the actuating member 95 to the right before the interference member 107 is cammed upwardly by the end of the slot 37 in the card 13. Thus when the interference member 107 is cammed upwardly by the end of the slot 37 the mask 38 is already rotated clockwise by an amount sufficient to bring the lug 115 past the interference member 107, so that when the card is fully inserted, the mask 38 is in the position shown in dashed lines in FIG. 5 of the drawing. In this position the mask 38 covers the aperture 17 and uncovers aperture 15, thereby allowing the student to read the equation format problems recorded in column 29 on the card 13. When the card is finished, the slot 37 in the trailing edge of the card 13 allows the interference member 107 to drop under the bias of spring 113 to its normal lowered position before the actuating member 95 is released so that the mask 38 returns freely to its normal position as shown in solid lines in FIG. 5.

Other mechanisms could equally well be used for controlling the position of the mask 38. For instance a magnetic spot could be recorded on the card 13 and sensed by a reading head in the teaching machine. The reading head could be used to control a solenoid or a miniature electric motor to move the mask 38 to cover one aperture or the other. This form of control however, would be substantially more expensive than that of the preferred embodiment.

Alternatively, the position of the mask 38 can be directly controlled by a manually actuable switch as indicated by reference numeral 25 in FIG. 1 of the drawing. This would be the least expensive mask control mechanism to provide. Further, the manually actuable switch 25 can be used in conjunction with the automatic mask positioning mechanism described above. When both the manual switch 25 and the automatic mask positioning mechanism are incorporated in the machine, the manual switch can be used as an override of the automatic mask positioning mechanism so cards without the proper notch 37 can be used in the machine to present problems through either of the viewing apertures 15 or 17. When it is desired to use viewing aperture 15 with an unnotched card, the manual selection switch 25 would be held in the righthand position until the card has contacted the interference member 107 and raised it so that the lug 115 on the mask cannot return to the normal at rest position in which viewing aperture 15 is masked.

Figure 7:
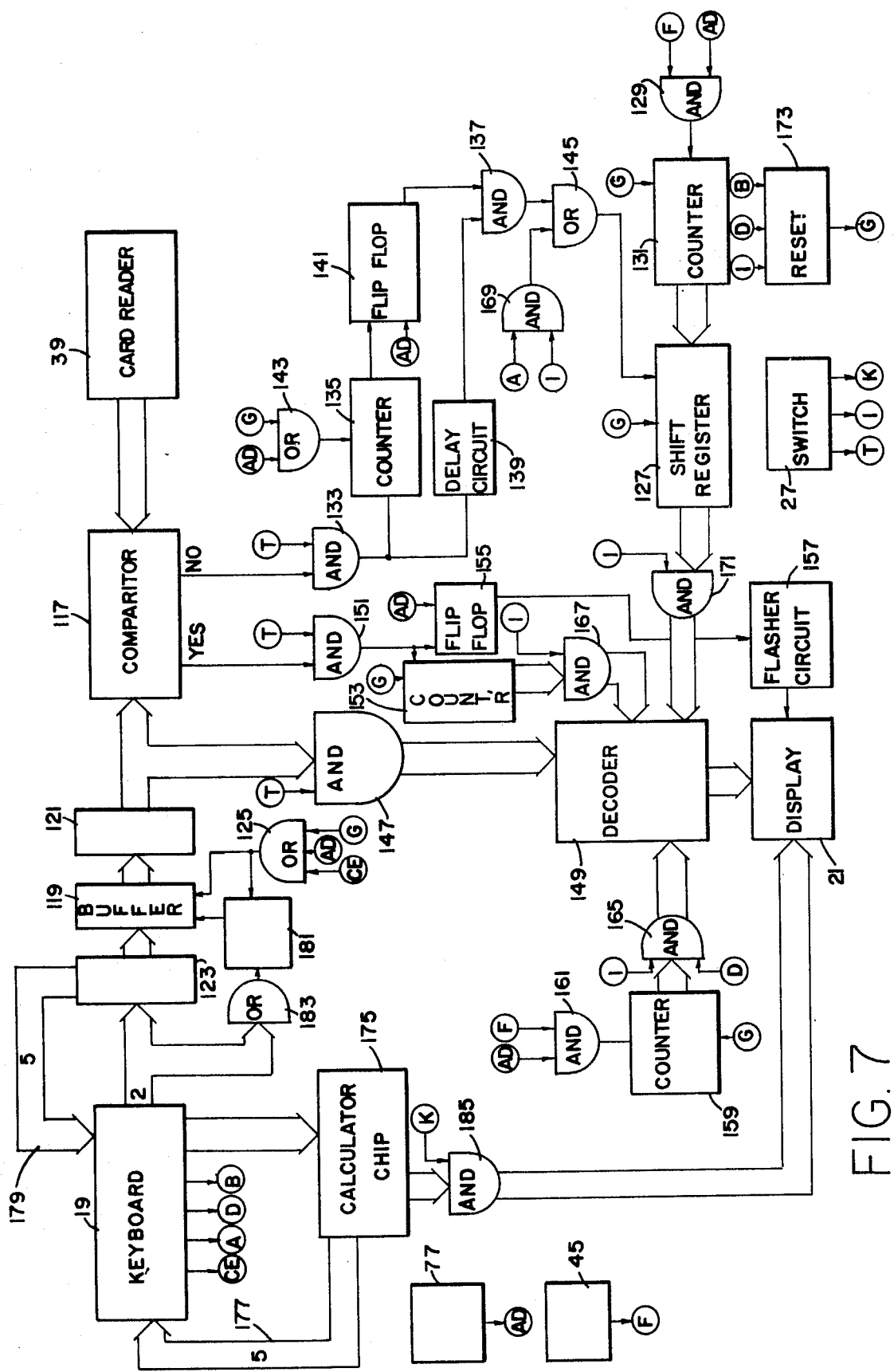
FIG. 7 is a schematic diagram of the electronic portion of the teaching machine of FIG. 1.

Referring now to FIG. 7 of the drawing, there is illustrated a schematic diagram of the electronic portion of the teaching machine of the illustrated embodiment of the invention. When the card 13 is positioned within the teaching machine with a problem in registry with an aperture 15 or 17, the output of the card reader 38 corresponds to the binary-coded-decimal answer to the problem read by the brushes 79. This output of the card reader 39 is connected to the comparator 117 which compares it to the contents of the twelve bit keyboard buffer 119 which it receives through the switching network 121. The answer entered by the student into the keyboard 19 is loaded into the buffer through the keyboard encoder 123 in the binary-coded-decimal form.

The comparator 117 may, for instance, consist of an array of twelve EXCLUSIVE OR Gates which receives as inputs the corresponding output bits of the buffer 119 and card reader 39 and whose output are all connected to a single OR Gate. The presence of an output from the single OR Gate indicates a non-coincidence between the output of the buffer 119 and the card reader 39, and therefore an incorrect answer entered in the keyboard 19 by the student. The output of the single OR gate can be used directly as the "NO" output of the comparator 117 and the inversion of the output of the single OR gate can be used as the "YES" output of the comparator 117.

If the student feels he has made a mistake in entering an answer into the keyboard 19, he depresses the clear entry (CE) 22 (FIG. 1) which actuates the CE output of the keyboard 19. The energization of the CE output of the keyboard 19 acts to clear the buffer 119 through the OR gate 125, thereby allowing the student to enter a new answer in the keyboard 19 and buffer 119.

The electronic portion of the teaching machine includes circuitry for storing the numbers of the problems which the student has answered incorrectly and also for indicating the number of incorrect attempts which the student makes in answering any one problem. This information is stored in the binary-coded-decimal shift register 127 which, depending on the number of problems which are envisioned being presented to the student at any one time, may have the capacity for storing and shifting 8 or 12 bit binary-coded-decimal numbers. If the maximum number of problems presented to the student in any exercise is less than 100, the binary-coded-decimal shift registers 127 may consist of 8 single bit shift registers operating in parallel, one for each of the bits of the two binary-coded-decimal digits. The maximum wrong answer counting capability of the shift register 127 is determined by the number of stages in it.

In order to keep track of the number of the problems being attempted by a student at any time, the output AD of the card advance microswitch 77 and the output F of the card presence indicating microswitch 45 are connected through an AND gate 129 to the binary-coded-decimal problem counter 131. Thus, each time the student advances the card by depressing the card advance lever 18, the problem counter 131 is incremented and thereby contains in binary-coded-decimal form the number of the problem being attempted. The output of the problem counter 131 is connected to the input of the shaft register 127.

Shifting of the data in the shift register 127 is accomplished by the "NO" output of the comparator 117 which is connected to one input of AND gate 133. The depression of the answer key 20 (FIG. 1) acts to actuate the A output of the keyboard 19. If the student enters an incorrect answer into the keyboard 19 the output of the buffer 119 does not agree with the output of card reader 39 so that the "NO" output of the comparator 117 is activated. If the student then depresses the answer key 20 the A output of the keyboard 19 is activated thereby gating the "NO" output of the comparator 117 through the AND gate 133 to the input of the counter 135 and to one input of the AND gate 137 through the delay circuit 139.

In the illustrated embodiment of the invention, the counter 135 and flip flop 141 are used to limit to four the counting of the number of incorrect attempts by the student to solve any particular problem. The counter 135, which has a maximum counting capability of four, counts the number of "NO" outputs of the comparator 117 gated through the AND gate 133. If more than four incorrect attempts are made on any one problem, the counter 135 overflows and sets flip flop 141 thereby setting its output connected to AND gate 137 to zero and blocking the AND gate 137. This prevents the counting of further incorrect answers to that problem. The delay circuit 139 need provide only enough delay (on the order of few tens of nanoseconds) so that the output of AND gate 133 can cause the counter 135 to overflow and set the flip flop 141 to block the AND gate 137 before the output of the AND gate 133 arrives at the AND gate 137. When the student depresses the card advance lever 18 to move to the next problem, the output AD of the card advance microswitch 77 resets the counter 135 to zero through the OR gate 143 and also resets the flip flop 141.

The output of the AND gate 137 is coupled through the OR gate 145 to the shift register 127 and acts to shift its contents by one place to the left as seen in FIG. 7, thereby loading the contents of the problem counter 131 into the rightmost stage of the shift register 127. If the student makes 2, 3 or 4 incorrect attempts to answer the problem, the number of the problem is loaded into the corresponding number of adjacent places in the shift register 127 thereby indicating the number of times that the problem is attempted incorrectly.

The answer entered by the student on the keyboard 19 and loaded into the buffer 119 is passed through the switching network 121 and gated through the array of twelve AND gates, collectively illustrated by AND gate 147, to the decoder 149. The decoder 149 decodes the binary-coded-decimal output of the buffer 119 in a well known manner into driving signals for the proper electrode segments of the liquid crystal or LED display 21 thereby causing the answer to appear on the display 21. The array of AND gates 147 is primed to pass the contents of the buffer 119 at all times while the key operated switch 27 is in the teaching machine position, during which time the T output of the switch 27 is present.

If the student enters the correct answer in the keyboard 19, output of the buffer 119 and the card reader 39 coincide so that the "YES" output of the comparator 117 is activated. The generation of the A output of the keyboard 19 upon the depression of the answer key 20 by the student acts to gate the "YES" output of the comparator 117 through the AND gates 151 to the correct answer counter 153 and the flip flop 155. The output of the flip flop 155 is connected to the flasher circuit 157 which is in turn connected to the flasher circuit 157 which is in turn connected to the display 21. When the flip flop 155 is set, the flasher circuit 157 causes the correct answer appearing on the display 21 to flash or blink, thereby indicating to the student the correctness of his answer and reinforcing his learning experience.

The flasher circuit 157 may for instance comprise a circuit placed between the power supply and the display 21 which, when actuated intermittently interrupts the supply of power to the display 21 and thus causes it to blink. Such circuits are well known in the art and do not form a part of the present invention. A typical one could be a triggerable astable multi-vibrator which, in the untriggered state, has its high side connected to the display 21.

When the student advances the card 13 to the next problem by depressing and returning the card advance lever 18 (FIG. 4), he activates the card advance microswitch 77 thereby generating the signal indicated as AD in FIG. 7 of the drawing.

The generation of the signal AD operates to reset the flip flop 155 and clears the buffer 119 through OR gate 125.

The card advance signal AD is also connected to the answer counter 159 through the AND gate 161 since the card sensing microswitch 45 generates the F signal during the entire time that the card 13 is present in the machine. The counter 159 thereby counts the number of problems which have been presented to the student whether or not he attempts to answer them. As stated above, the counter 153 counts the number of correct answers made by the student.

The card presence detecting microswitch 45 (FIG. 4) is positioned with respect to the apertures 15 and 17 in such a way that, as the student depresses the lever 18 after the last problem on the card 13, the actuating member of the microswitch 45 is released by the chamfered portion 163 of the trailing edge of the card 13 before the member 75 actutes the card advance microswitch 77. Thus, referring to FIG. 7 of the drawing, the output F of the microswitch 45 is deactivated and blocks AND gate 161 before the signal AD is generated by the card advance microswitch 77. In this manner the advance of the card after the last problem is not counted by the counter 159.

In the illustrated embodiment, for the count in counter 159 to be correct, the visually readable statements of problems appearing on the card 13 in either equation or algorithm form should be positioned in such a manner that the first depression of the card advance lever 18 after the insertion of a card 13 brings the first problem on the card 13 into registry with the viewing apertures 15 or 17.

When the teacher wishes to interrogate the teaching machine to determine the number of problems attempted by the student, the number of problems answered correctly and the numbers of the problems which were answered incorrectly, he inserts a key into the key operated switch 27 in the teaching machine position and depresses predetermined keys on the keyboard 19 to cause the relevant information to appear on the display 21. To determine the number of problems attempted, the teacher inserts the key, thereby causing the key operated switch 27 to generate the I output. With the key inserted the "3" key on the keyboard 19 is depressed, thereby activating output D of the keyboard 19. This causes the array of AND gates 165 to gate the output of the counter 159 into the decoder 149 which in turn decodes the contents of the counter 159 and energizes the correct electrode segments of the display 21 for displaying the number stored in the counter 159.

To determine the number of correct answers, the teacher, while the key is inserted in the switch which is in the teaching machine position depresses the 3 key on the keyboard 19, thereby actuating the B output of the keyboard 17. This in turn causes the array of AND gates 167 to gate the contents of the counter 153 to the decoder 149 for display on the display 21.

In order to determine the numbers of the problems which the student answered incorrectly the teacher, while the key is inserted in the teaching machine position, depresses the answer key 20 thereby activating the A output of the keyboard 19. The A output is gated through the AND gate 169 and the OR gate 145 since the I output of the key operated switch 27 is present and so increments the shift register 127. Repeated depressions of the answer key 20 by the teacher cause the contents of the shift register 127 to be shifted one place to the left (as viewed in FIG. 7) for each depression. The numbers of the incorrectly attempted problems stored in the shift register 127 are emitted at the output thereof and are gated through the array of AND gates 171, which is enabled by the presence of the I output of the switch 27, to the decoder 149 for display on the display 21. Thus the successive depressions of the answer key 20 with the key inserted in the switch 27 in the teaching machine mode cause the display of the numbers of the successive incorrectly attempted problems on the display 21.

In order to clear the shift register 127, the problem counter 131, the counter 135, the counter 153, the counter 159 and the buffer register 119, the teacher, with the key inserted in the switch 27 in the teaching machine mode position, depresses both the 3 and 8 keys simultaneously thereby causing the general reset circuit 173 to generate the output G which clears all the above-mentioned circuits.

An important feature of the teaching machine in the present invention is its ability to allow the student to enter the answers to the problems presented to him at the viewing aperture 15 or 17 either from left to right or right to left. This is accomplished by means of the switching network 121 connected between buffer 119, and the comparator 117. This switching network 121, which is controlled from the face of the teaching machine (FIG. 1) by the switch 23, operates to pass the digits of the answers straight through to the comparitor 117 when the switch 23 is in the L-R position and to reverse the order of the entered digits when the switch 23 is in the R-L position.

Another important feature which adds greatly to the versatility of the teaching machine of the invention lies in its ability to be used also as a calculator. To be used in the calculator mode, the teacher must turn the key operated switch 27 to the calculator position thereby activating the K output of the switch 27 and deactivating the T output. This blocks the AND gates 147, 133 and 151 and prevents the machine from being used in the teaching machine mode.

Besides being connected to the buffer 119 through the keyboard encoder 123 the output from the keyboard 19 is also connected, in the illustrated embodiment of the invention, to the MOS calculator chip 175. Four function MOS calculator chips have in recent times become available from several manufacturers such as Texas Instruments, Mostek, Caltek, Intel, Fairchild, Rockwell International and Toshiba, and, as such, are now articles of commerce. Typical chip designation are the TMS1802 from Texas Instruments, the MK5020 and NK50121 from Mostek, and the Rockwell 15330 from Rockwell International. The particular chip used, and the internal logic arrangement thereof from no part of the present invention.

These calculator chips perform the four arithmetic functions of addition, subtraction, multiplication and division on data entered from a keyboard. Models of these chips are presently available which operate on 6 to 8 or more digits and generally work in conjunction with a display.

The keys of the keyboard 19 in the illustrated embodiment of the invention may act as switches, each of which is connected between a row and a column conductor of an encoding matrix having five rows. The switch is closed when the key is depressed, thereby connecting the row and column conductor of the matrix to which it is connected, and is opened when the key is released. The column conductors of the matrix are connected to the calculator chip 175 and to the keyboard encoder 123, while the calculator chip 175 and the keyboard encoder 123 are connected by five interrogate lines 177 and 179 respectively to the row conductors of the matrix.

Both the calculator chip 175 and the keyboard encoder 123 usually contain internal clocks operating on a frequency on the order of 200 Khz which causes each of them to apply interrogate pulses to the five row conductors of the matrix in sequence. Whether or not an internal clock is included, an external clock may be used to drive the chips, if desired. When a key on the keyboard 19 is depressed, the corresponding row and column conductors are connected so that the interrogate pulse applied to that row by the calculator chip 175 or keyboard encoder 123 is returned to the calculator chip 175 or the keyboard encoder 123 respectively, by the connected column conductor. The above-mentioned commercially available calculator chips all include a decoder for translating this output from the keyboard 19 into the numerical and operational codes within the chip 175 to perform the entered calculation.

Keyboard encoders 123 are also articles of commerce available from several manufacturers and the particular one used forms no part of the present invention. Typical ones which are now commercially available are the TMS5900 made by Texas Instruments, the MCS1007 and MCS1008 made by MOS Technology Corporation, the AY-5-2376 made by General Instruments Company, and the MM5740 made by National Semiconductor Corporation.

These keyboard encoder chips receive the outputs from the keyboard 19 and translate them into binary, binary-coded-decimal, or other code, as desired.

The calculator chip 175 and keyboard encoder 123 are generally arranged so that only two of the input lines from the keyboard 19 contain numerical data. Therefore the keyboard encoder 123 need receive only these two lines from the keyboard 19. The output of the keyboard encoder 123 is in binary-coded-decimal form and is loaded into a digit place in the three digit buffer 119. The digit location in the three digit buffer 19 into which the binary-coded-decimal digit output of the keyboard encoder 123 is loaded is controlled by the three stage ring counter 181 which is incremented through OR gate 183 each time there is a numerical output from the keyboard 19 to the keyboard encoder 123. The ring counter 181 is reset, for causing the next output of the keyboard encoder 123 to be loaded into the first digit place of the buffer 119 by the output of the OR gate 125 which as explained above also clears the buffer 119.

Means may also be provided, if necessary, to deactivate either the keyboard encoder 123 or the calculator chip 175 when the K or T outputs, respectively, of the key operated switch 27 are present in order to prevent interference of the operation of one with the other. Besides the numerical inputs from the keyboard 19, the calculator chip 175 receives as control inputs from the keyboard 19 signals generated by the depression of the $+$, $-$, $\times$, $\div$ keys; the CE key 22 and the answer key 20. The depression of the CE key 22 operates to clear the last numerical entry entered on the keyboard 19 when depressed before the answer key 20 is depressed and operates to clear the entire chip 175 when it is depressed after the answer key 20 is depressed. The depression of the answer key 20 acts to cause a display of the answer of the entered calculation.

The commercially available calculator chips listed above all contain a decoder for decoding the answers generated by the chip logic into driving signals for the elements of the display 21. The output lines from the calculator chip 175 may therefore be connected directly to the display 21 through the array of AND gates 185 without having to go through the decoder 149. If an LED display is used, a current amplification stage would be needed between the calculator chip 175 and the display 21 because of the power requirements for driving the display 21. If a liquid crystal display is used, no amplification stage is needed. It may also be necessary to insert isolation elements, such as diodes, between the decoder 149 and the display 21 and the chip 175 and the display 21 in order to prevent the decoder 149 and the chip 175 from interfering with one another.

The AND gates 185 are enabled by the presence of the K output of the key operated switch 27. When being used in the calculator mode the output of the calculator chip 175 to the display 21 generally includes each of the numerical entries entered by the student on the keyboard 19 and the answer to the entered calculation when the answer key 20 is depressed.

In the illustrated embodiment of the invention the display 21 need have only a 3 digit capacity when used in the teaching machine mode. When used in the calculator mode, however, it is preferred that the display 21 have a 6 or 8 digit capacity. For machine layout design reasons, it is preferred that the leftmost 3 digits be used in the teaching machine mode.

It should be apparent from the foregoing description of an embodiment of the invention that other card advance mechanisms, card reading mechanisms or circuit arrangements may equally well be substituted for those illustrated and described herein.

Other mechanizations could also be used to allow the teacher to determine the number of problem answers attempted and correct answers by the student. For instance, the teaching machine could be constructed to allow the teacher to interrogate the machine to determine the number of attempts, correct answers and numbers of the incorrectly attempted problems by the student without the use of a key or external implement. So, for example, the teaching machine could be provided to allow the teacher to determine the number of answer attempts and correct answers by merely pressing number keys of the keyboard simultaneously or in specific sequence.

Furthermore, it should also be noted that the counters could equally well count other quantities of interest to the teacher, for instance, the number of correct and incorrect answers entered by the student. These other quantities would, in any case, allow the simple determination of the number of problems attempted and the number of correct answers achieved.

At this point, it should be noted that the teaching machine described above has many features which make it suitable for the purpose of teaching relatively young students, in the lower grades, arithmetic, though, of course, its use is not restricted to this function only. However, the machine can be made of relatively small size, since much, if not all of the electronics can be provided by maeans of miniaturized, solid-state circuitry, and there are relatively few mechanical moving parts. The machine therefore, can easily be designed to be manipulated by relatively young children. Additionally, the machine can be battery-powered, to make it portable and, therefore, more convenient for use.

The use of the record member with problems to be answered by the student appearing on both sides of the member adds efficiently to the use of the machine by cutting down the number of cards or record members which must be used in association with the teaching machine to progress through a designated teaching program. Further, by designing the cards for coaction with the automatic mask positioning apparatus there is much less chance of the student becoming confused in the operation of the teaching machine, and thereby inappropriately effecting the results of any tests that he has taken on the machine.

Of course, both algorithm and equation format problems can be placed on a single card designed to coact with the automatic mask positioning apparatus. All that would be necessary would be to place cooperating notch on only one end of the card and then arrange the columns of the algorithm format problems in proper relation to the notched end of the card.

The teaching machine described above can be used by students not only for problems which are visually readable on the record member, but additionally, printed teaching programs coordinated to record members which in turn provide the machine readable answers to the question in the programs. So, for example, "programmed" teaching programs or multiple choice teaching programs can be developed in booklet form and coordinated with record members containing machine readable answers for the corresponding booklet. The student would then index the record member or card to a specific problem number, read the problem in the book and then enter his answer on the keyboard. The key display would then flash if the student's answer was correct. The teacher could then periodically check progress of the student or else wait until the entire teaching program was completed in order to check the score of the student.

The visual reinforcement means of the invention should not be restricted to the flashing of the display when the correct answer is entered. Many other methods of visually distinguishing correct from incorrect answers can also be employed within the scope of the invention. For example, the electrical circuitry could be designed so that all incorrect answers would appear only intermittently, or with much less brilliance than correct answers. Indicators could also be used in the display such as underlining or stars, etc. to distinguish the correct from incorrect answer.

One of the main advantages of the teaching machine described above is the ability for the student to work almost independently of the teacher, since the records of his progress are accurately stored by the machine and cannot be tampered with, and the teacher can very simply come to check the progress of the student by merely interrogating the machine to determine the number of attempts and correct answers that the student has produced.

It will be understood that various changes in the details, materials and arrangements of parts which have been herein described and illustrated in order to explain the nature of the invention may be made by those skilled in the art within the principle and scope of the invention, as expressed in the appended claims.

What is claimed is:

1. A card record member for use in a teaching machine comprising:

a column of visually readable problem statements recorded thereon in one of two predetermined positions;

a column of machine readable answers corresponding to said visually readable problem statements; and means on said card record member for controlling the position of a mask in said teaching machine to cover one or the other of said predetermined column positions while said card is in said machine;

a second column of visually readable problem statements recorded in the opposite sense from said first column in the other of said predetermined column positions;

a second column of machine readable answers to the problem statements in said second column of visually readable problem statements;

said columns of visually readable problem statements being recorded on either side of the center line of said card, and said columns of machine readable answers being recorded on either side of said columns of visually readable problem statements between said columns of problem statements and the edges of said card member for allowing said card record member to be inserted into said teaching machine in either direction.

2. An educational system which comprises the combination of a record member and a teaching machine having:

a display on which is shown the answer entered by a student to a visually readable statement of a problem;

entry means for allowing the student to enter an answer to the problem;

means for energizing the display to display the answer entered by the student into said entry means;

means for causing the answer shown on said display to visually differ in accordance with whether said answer is correct or incorrect, comprising:
  means for generating the correct answer to the visually readable statement of a problem; and
  means for comparing the answer entered by the student with said correct answer;

means for receiving a record member having recorded thereon a visually readable statement of a problem and a machine readable answer to said problem;

wherein said means for generating the correct answer includes means for reading a machine readable answer on a record member;

the record member comprising:
  a column of visually readable problem statements recorded thereon in one of two predetermined positions;
  a column of machine readable answers corresponding to said visually readable problem statements; and
  means on said card record member for controlling the position of a mask in said teaching machine to cover one or the other of said predetermined column positions while said card is in said machine.

3. The educational system according to claim 2, wherein the card record member further comprises:
  a second column of visually readable problem statements recorded in the opposite sense from said first column in the other of said predetermined column positions;
  a second column of machine readable answers to the problem statements in said second column of visually readable problem statements; and
  said columns of visually readable problem statements being recorded on either side of the center line of said card, and said columns of machine readable answers being recorded on either side of said columns of visually readable problem statements between said columns of problem statements and the edges of said card record member for allowing said card record member to be inserted into said teaching machine in either direction.

4. An educational system which comprises the combination of a record member and a teaching machine, having:
  a display for serially displaying the answers entered by a student to a plurality of visually readable problem statements;
  means for receiving a record member;
  means adapted to sequentially present a plurality of visually readable problem statements to the student;
  entry means for allowing the student to enter answers to the problem statements presented;
  means for detecting when an answer entered by the student is incorrect;
  means responsive to said detecting means upon the detection of the entry of each incorrect answer for storing the number of each problem answered incorrectly;
  means for interrogating said storing means for causing the display of the numbers of the incorrectly attempted problems on said display;
  the record member comprising:
    a column of visually readable problem statements recorded thereon in one of two predetermined positions;
    a column of machine readable answers corresponding to said visually readable problem statements; and
    means on said card record member for controlling the position of a mask in said teaching machine to cover one or the other of said predetermined column positions while said card is in said machine.

5. The educational system according to claim 4, wherein the card record member further comprises:
  a second column of visually readable problem statements recorded in the opposite sense from said first column in the other of said predetermined column positions;
  a second column of machine readable answers to the problem statements in said column of visually readable problem statements; and
  said columns of visually readable problem statements being recorded on either side of the center line of said card, and said columns of machine readable answers being recorded on either side of said columns of visually readably problem statements between said columns of problem statements and the edges of said card record member for allowing said card record member to be inserted into said teaching machine in either direction.

6. An educational system which comprises the combination of a record member and a teaching machine adapted for use with an insertable record member having a column of visually readable problem statements and a corresponding column of machine readable answers to said problems, with said column of visually readable problem statements being in one of two predetermined positions on said card, said teaching machine having:
  entry means for allowing a user to enter an answer to a visually readable problem statement on said card;
  a display for displaying the answers entered on said entry means by said user;
  means for incrementally transporting said record member along a path through the machine;
  first and second viewing apertures positioned to align with the first and the second predetermined positions on said card, respectively, for successively presenting to the user individual visually readable problem statements recorded in the first or second column position respectively on the record member, said display being positioned to the right of said first viewing aperture and below said second aperture for presenting said individual problem statements visible at one of said viewing apertures in either an equation or algorithm form;
  the record member comprising:
    a column of visually readable problem statements recorded thereon in one of two predetermined positions;
    a column of machine readable answers corresponding to said visually readable problem statements; and
    means on said card record member for controlling the position of a mask in said teaching machine to cover one or the other of said predetermined column positions while said card is in said machine.

7. The educational system according to claim 6, wherein the card record member further comprises:
   a second column of visually readable problem statements recorded in the opposite sense from said first column in the other of said predetermined column positions;
   a second column of machine readable answers to the problem statements in said second column of visually readable problem statements; and
   said columns of visually readable problem statements being recorded on either side of the center line of said card, and said columns of machine readable answers being recorded on either side of said columns of visually readable problem statements between said columns of problem statements and the edges of said card record member for allowing said card record member to be inserted into said teaching machine in either direction.

8. An educational system which comprises the combination of a record member and a teaching machine in which the answer to a visually readable statement of a problem is displayed on a display, the teaching machine having:
   entry means for allowing the entry by the user of an answer to said problem statement;
   means for causing the answer entered by the user on said entry means to appear on said display;
   calculator means for calculating the answer to a problem entered in said entry means by the user;
   means for causing said answer calculated by said calculator means to appear on said display;
   means for causing the answer shown on said display to visually differ in accordance with whether said answer is correct or incorrect, comprising:
      means for generating the correct answer to the visually readable statement of a problem; and
      means for comparing the answer entered by the student with said correct answer;
   means for receiving a record member having recorded thereon the visually readable statement of a problem and a machine readable answer to said problem;
   wherein said means for generating the correct answer includes means for reading a machine readable answer on a record member; and
   the record member comprising:
      a column of visually readable problem statements recorded thereon in one of two predetermined positions;
      a column of machine readable answers corresponding to said visually readable problem statements; and
      means on said card record member for controlling the position of a mask in said teaching machine to cover one or the other of said predetermined column positions while said card is in said machine.

9. The educational system according to claim 8, wherein the card record member further comprises:
   a second column of visually readable problem statements recorded in the opposite sense from said first column in the other of said predetermined column positions;
   a second column of machine readable answers to the problem statements in said second column of visually readable problem statements; and
   said columns of visually readable problem statements being recorded on either side of the center line of said card, and said columns of machine readable answers being recorded on either side of said columns of visually readable problem statements between said columns of problem statements and the edges of said card record member for allowing said card record member to be inserted into said teaching machine in either direction.

* * * * *